United States Patent
Keeling et al.

(10) Patent No.: US 10,199,885 B2
(45) Date of Patent: Feb. 5, 2019

(54) METHODS AND APPARATUS UTILIZING MULTI-FILAR ALIGNMENT ASSISTANCE IN WIRELESS POWER TRANSFER APPLICATIONS

(71) Applicant: QUALCOMM Incorporated, San Diego, CA (US)

(72) Inventors: Nicholas Athol Keeling, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 14/858,369

(22) Filed: Sep. 18, 2015

(65) Prior Publication Data

US 2017/0085137 A1    Mar. 23, 2017

(51) Int. Cl.
*H02J 50/90* (2016.01)
*B60L 11/18* (2006.01)
(Continued)

(52) U.S. Cl.
CPC .............. *H02J 50/90* (2016.02); *B60L 11/182* (2013.01); *G01D 5/2006* (2013.01); *H02J 5/005* (2013.01)

(58) Field of Classification Search
CPC .............. H02J 50/10; H02J 50/12; H02J 50/90
See application file for complete search history.

(56) References Cited

U.S. PATENT DOCUMENTS 6,960,968 B2    11/2005    Odenaal et al.
8,629,651 B2     1/2014    Guccione et al.
(Continued)

FOREIGN PATENT DOCUMENTS

JP      2006203997 A  *  8/2006  .............. H02J 50/90
WO    WO-2010036980 A1    4/2010
(Continued)

OTHER PUBLICATIONS

EPO Patent Translate of the Description Portion of JP2006203997, printed Jan. 16, 2018.*
(Continued)

*Primary Examiner* — Fritz M Fleming
(74) *Attorney, Agent, or Firm* — Knobbe, Martens, Olson & Bear LLP (57) ABSTRACT

An implementation provides an apparatus for determining an alignment of a wireless power coupler of a vehicle with a wireless power transmitter. The apparatus comprises a sensing circuit configured to measure a current in a plurality of separate conductors of the wireless power coupler. The apparatus comprises a controller configured to determine information related to an alignment of the wireless power coupler with the wireless power transmitter based at least in part on the measured current in the plurality of separate conductors. The controller is configured to determine the information related to the alignment of the wireless power coupler with the wireless charging power transmitter based on a difference between the measured current in the plurality of separate conductors. The information comprises a direction and distance of offset between the wireless power coupler and the wireless power transmitter. The measured current is a short circuit current.

26 Claims, 7 Drawing Sheets

(51) Int. Cl.
*G01D 5/20* (2006.01)
*H02J 5/00* (2016.01)

(56) References Cited

U.S. PATENT DOCUMENTS

| | | | |
|---|---|---|---|
| 2010/0201315 A1* | 8/2010 | Oshimi | H02J 50/10 |
| | | | 320/108 |
| 2012/0309306 A1* | 12/2012 | Kim | H04B 5/0031 |
| | | | 455/41.1 |
| 2013/0024059 A1* | 1/2013 | Miller | H02J 50/12 |
| | | | 320/108 |
| 2013/0270921 A1* | 10/2013 | Boys | H02J 50/90 |
| | | | 307/104 |
| 2014/0015328 A1 | 1/2014 | Beaver et al. | |
| 2014/0125140 A1* | 5/2014 | Widmer | H02J 50/12 |
| | | | 307/104 |
| 2014/0239729 A1 | 8/2014 | Covic | |

FOREIGN PATENT DOCUMENTS

| | | | | |
|---|---|---|---|---|
| WO | WO 2010090539 A1 * | 8/2010 | ............. | H02J 50/10 |
| WO | WO-2011112795 A1 | 9/2011 | | |
| WO | WO-2012098851 A1 | 7/2012 | | |

OTHER PUBLICATIONS

International Search Report and Written Opinion—PCT/US2016/049219—ISA/EPO—dated Nov. 4, 2016.

* cited by examiner

METHODS AND APPARATUS UTILIZING MULTI-FILAR ALIGNMENT ASSISTANCE IN WIRELESS POWER TRANSFER APPLICATIONS

FIELD

This disclosure generally relates to wireless power transfer. More specifically, the disclosure is directed to methods and apparatuses utilizing multi-filar alignment assistance in wireless power transfer applications.

BACKGROUND

Inductive power transfer (IPT) systems are designed to wirelessly transfer charging power from a base pad to a vehicle pad. Such wireless power transfer is most efficient when the base pad and the vehicle pad are properly aligned with each other. However, conventional systems utilizing measurements or determinations of mutual coupling between a primary coupler in the base pad and a secondary coupler in the vehicle pad, or induced voltage or current in the secondary coupler only provide a scalar distance of misalignment at best. Thus, a user of the vehicle or an alignment system within the vehicle cannot know in which direction the secondary coupler is misaligned with respect to the primary coupler without more information.

SUMMARY

An apparatus for determining an alignment of a wireless power coupler of a vehicle with a wireless power transmitter. The apparatus comprises a sensing circuit configured to measure a current in a plurality of separate conductors of the wireless power coupler. The apparatus comprises a controller configured to determine information related to an alignment of the wireless power coupler with the wireless power transmitter based at least in part on the measured current in the plurality of separate conductors.

A method for determining an alignment of a wireless power coupler of a vehicle with a wireless power transmitter is provided. The method comprises measuring a current in a plurality of separate conductors of the wireless power coupler. The method comprises determining information related to an alignment of the wireless power coupler with the wireless power transmitter based at least in part on the measured current in the plurality of separate conductors.

A non-transitory computer-readable medium comprising code is provided. The code, when executed, causes an apparatus for determining an alignment of a wireless power coupler of a vehicle with a wireless power transmitter to measure a current in a plurality of separate conductors of the wireless power coupler. The code, when executed, causes the apparatus to determine information related to an alignment of the wireless power coupler with the wireless power transmitter based at least in part on the measured current in the plurality of separate conductors.

An apparatus for determining an alignment of a wireless power coupler of a vehicle with a wireless power transmitter is provided. The apparatus comprises means for measuring a current in a plurality of separate conductors of the wireless power coupler. The apparatus comprises means for determining information related to an alignment of the wireless power coupler with the wireless power transmitter based at least in part on the measured current in the plurality of separate conductors.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the application and is not intended to represent the only implementations that may be practiced. The term "exemplary" used throughout this description means "serving as an example, instance, or illustration," and should not necessarily be construed as preferred or advantageous over other implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coil" to achieve power transfer.

Figure 1:
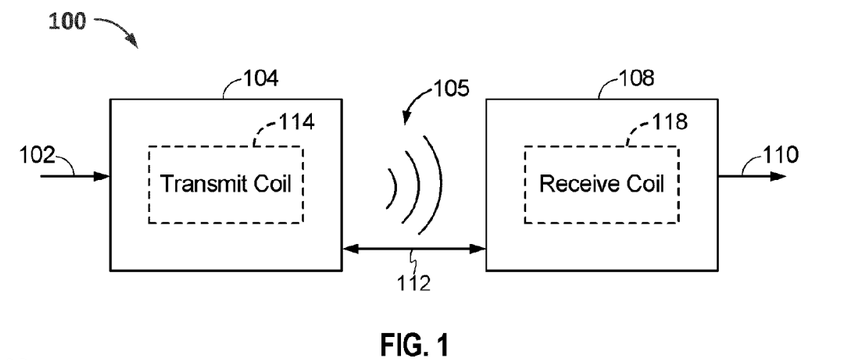
FIG. 1 is a functional block diagram of a wireless power transfer system, in accordance with some implementations.

FIG. 1 is a functional block diagram of a wireless power transfer system 100, in accordance with some implementations. An input power 102 may be provided to a transmit coil 114 (e.g., a transmit antenna circuit 114) of a transmitter 104 from a power source (not shown) to generate a wireless (e.g., magnetic or electromagnetic) field 105 for performing energy or power transfer. A receive coil 118 (e.g., a receive antenna circuit 118) of a receiver 108 may couple to the wireless field 105 and may generate an output power 110 for storing or consumption by a device (not shown) coupled to the output power 110. Both the transmitter 104 and the receiver 108 may be separated by a distance 112.

In one implementation, the transmit coil 114 and the receive coil 118 are configured according to a mutual resonant relationship. When the resonant frequency of the receive coil 118 and the resonant frequency of the transmit coil 114 are substantially the same, or very close, transmission losses between the transmitter 104 and the receiver 108 are minimal. As such, wireless power transfer may be provided over a larger distance in contrast to purely inductive solutions that may require large coils placed very close to one another (e.g., sometimes within millimeters). Resonant inductive coupling techniques may thus allow for improved efficiency and power transfer over various distances and with a variety of inductive coil configurations.

The receiver 108 may receive power when the receive coil 118 is located in the wireless field 105 produced by the transmit coil 114. The wireless field 105 corresponds to a region where energy output by the transmit coil 114 may be captured by the receive coil 118. The wireless field 105 may correspond to the "near-field" of the transmitter 104. The "near-field" may correspond to a region in which there are strong reactive fields resulting from the currents and charges in the transmit coil 114 that minimally radiate power away from the transmit coil 114, rather than radiating electromagnetic energy away into free space. The "near-field" may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit coil 114 and the receive coil 118 where this coupling may occur is referred to herein as a coupling-mode region.

Figure 2:
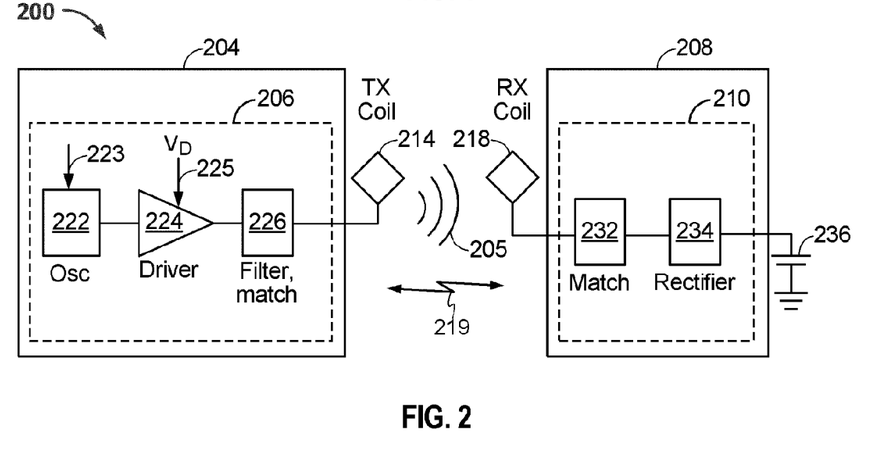
FIG. 2 is a functional block diagram of a wireless power transfer system, in accordance with another implementation.

FIG. 2 is a functional block diagram of a wireless power transfer system 200, in accordance with another implementation. The system 200 includes a transmitter 204 and a receiver 208. The transmitter 204 may include a transmit circuit 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coil 214 at, for example, a resonant frequency of the transmit coil 214 based on an input voltage signal ($V_D$) 225. The filter and matching circuit 226 may filter out harmonics or other unwanted frequencies and may also match the impedance of the transmitter 204 to the impedance of the transmit coil 214 for maximal power transfer. The driver circuit 224 may drive a current through the transmit coil 214 to generate a wireless field 205 for wirelessly outputting power at a level sufficient for charging a battery 236 of an electric vehicle, for example.

The receiver 208 may include a receive circuit 210 that may include a matching circuit 232 and a rectifier circuit 234. The matching circuit 232 may match the impedance of the receive circuit 210 to the receive coil 218. The rectifier circuit 234 may generate a direct current (DC) power output from an alternating current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via band signaling using characteristics of the wireless field 205. The receiver 208 may be configured to determine whether an amount of power transmitted by the transmitter 204 and received by the receiver 208 is appropriate for charging the battery 236.

Figure 3:
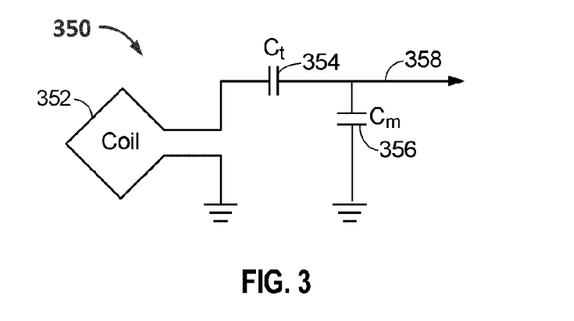
FIG. 3 is a schematic diagram of a portion of the transmit circuit or the receive circuit of FIG. 2 including a transmit coil or a receive coil, in accordance with some implementations.

FIG. 3 is a schematic diagram of a portion of the transmit circuit 206 or the receive circuit 210 of FIG. 2 including a transmit coil or a receive coil, in accordance with some implementations. As illustrated in FIG. 3, a transmit or receive circuit 350 may include a coil 352. The coil 352 may also be referred to as a "loop" antenna, a "magnetic" coil or an induction coil 352. The term "coil" generally refers to a component that may wirelessly output or receive energy for coupling to another "coil." As used herein, the coil 352 is an example of a "power transfer component" of a type that is configured to wirelessly output and/or receive power. The coil 352 may include an air core or a physical core such as a ferrite core (not shown).

The resonant frequency of a coil is based on the inductance and capacitance of the coil. Inductance may be simply the inductance created by the coil 352, whereas, capacitance may be added to the coil's inductance to create a resonant structure at a desired resonant frequency. As a non-limiting example, a capacitor 354 and a capacitor 356 may be added to the transmit or receive circuit 350 to create a resonant circuit that selects a signal 358 at a resonant frequency. Accordingly, for larger diameter coils, the size of capacitance needed to sustain resonance may decrease as the diameter or inductance of the coil increases.

Furthermore, as the diameter of the coil increases, the efficient energy transfer area of the near-field may also increase. Other resonant circuits formed using other components are also possible. As another non-limiting example, a capacitor may be placed in parallel between the two terminals of the circuit 350. For transmit coils, the signal 358, with a frequency that substantially corresponds to the resonant frequency of the coil 352, may be an input to rather than an output from the coil 352.

Figure 4:
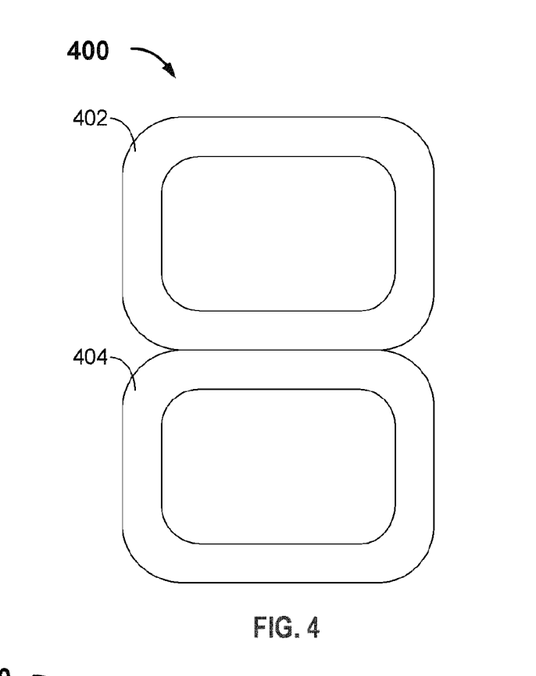
FIG. 4 illustrates a simplified coupler for a wireless power transfer system, in accordance with some implementations.

FIG. 4 illustrates a simplified coupler 400 for a wireless power transfer system, in accordance with some implementations. The ideal coupler 400 may be utilized in either a wireless power transmitter (e.g., within a base pad) or a wireless power receiver (e.g., within a vehicle pad). The ideal coupler 400 comprises a first coil 402 and a second coil 404 arranged adjacent to the first coil 402. In some implementations, the first coil 402 and the second coil 404 may be electrically connected in series with one another and driven by the same driver circuit. In some other implementations, the first coil 402 and the second coil 404 may be independently driven by separate driver circuits. As shown, the ideal coupler 400 may comprise an ideal double D coupler topology.

Figure 5:
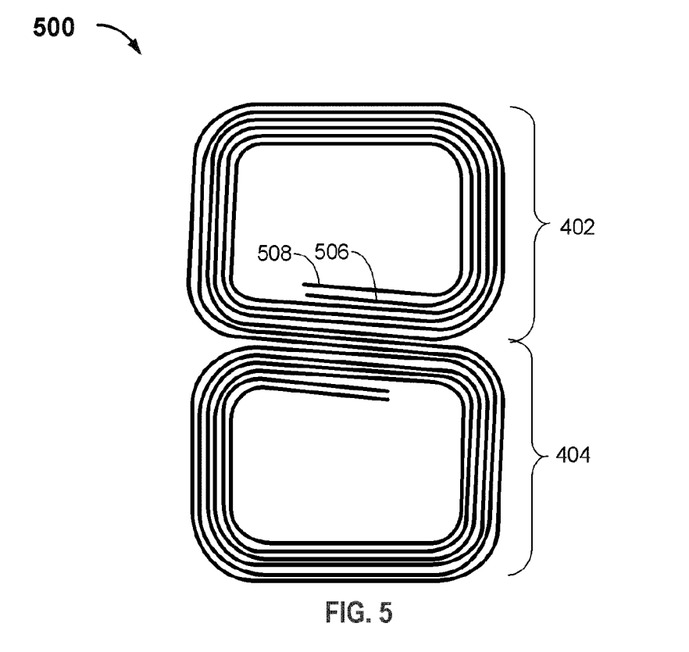
FIG. 5 illustrates a more detailed view of the coupler of FIG. 4, in accordance with some implementations.

FIG. 5 illustrates a more detailed view 500 of the coupler of FIG. 4, in accordance with some implementations. As shown in FIG. 5, each of the first coil 402 and the second coil 404 are formed from a plurality of separate conductors (e.g., a plurality of filars or a "multi-filar" coil assembly). For example, the coupler of FIG. 5 illustrates the first and second coils 402, 404 connected to one another in series and formed from the same first conductor 506 and second conductor 508. As shown, for each turn of the first coil 402 the first conductor 506 may be wound outside of the second conductor 508. Contrarily, for each turn of the second coil 404 the first conductor 506 may be wound inside of the second conductor 508. In some implementations, the first and second conductors 506, 508 may not be electrically connected to one another at any points along the winding paths for the first and second coils 402, 404. As a consequence of the above-described winding pattern, the first conductor 506 and the second conductor 508 may each encircle slightly different patterns and/or amounts of magnetic flux generated by a base pad (not shown) in proximity to the first coil 402 and the second coil 404. In some implementations, knowledge of this difference in patterns and/or amounts of magnetic flux encircled by the first conductor 506 and the second conductor 508 may be utilized to determine a distance and direction from the actual coupler 500 to the base coupler (e.g., the vehicle's alignment).

Figure 6:
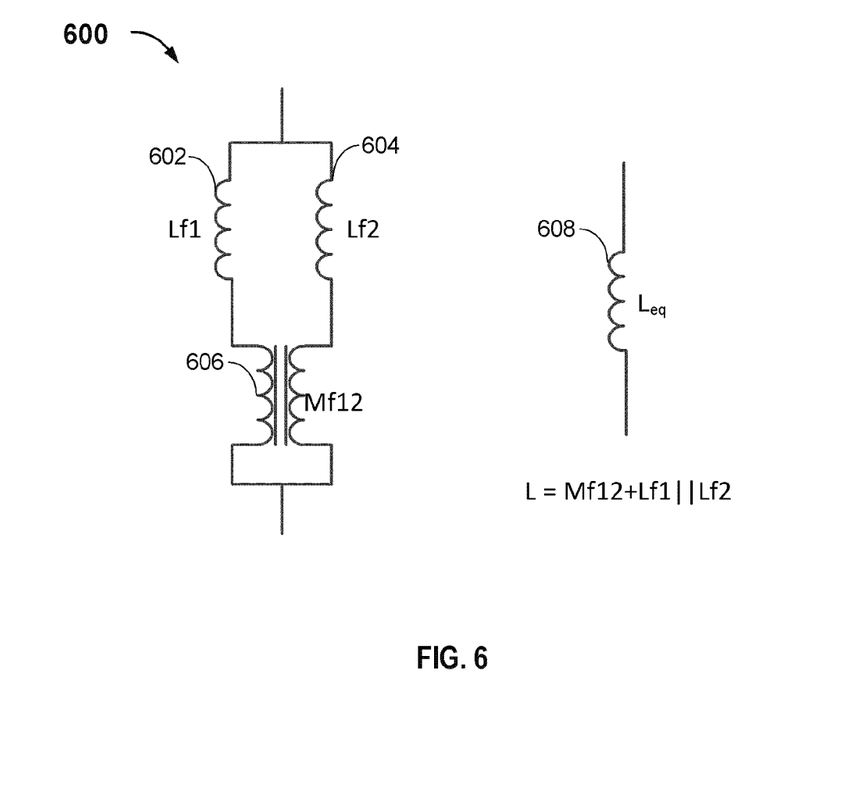
FIG. 6 shows an equivalent circuit diagram of the first conductor and the second conductor that form the first coil and the second coil shown in FIG. 4 as well as an equivalent inductance of the equivalent circuit diagram.

FIG. 6 shows an equivalent circuit diagram 600 of the first conductor 506 and the second conductor 508 that form the first coil 402 and the second coil 404 shown in FIG. 4 as well as an equivalent inductance 650 of the equivalent circuit diagram 600. For example, the first conductor 506 and the second conductor 508 may be connected in parallel with one another. The first conductor 506 may be represented as a first inductor 602 having a first inductance $L_{f1}$. The second conductor 508 may be represented as a second inductor 604 having a second inductance $L_{f2}$. Since the first conductor 506 and the second conductor 508 are located physically close to one another, each will also have a shared mutual inductance $M_{f12}$ with one another, represented by the coupled transformer 606. Thus, the first and second conductors 506, 508 may be represented by a single inductor 608 having an equivalent inductance value equal to the shared mutual inductance $M_{f12}$ plus a value of the first inductance $L_{f1}$ in parallel with the second inductance $L_{f2}$, as shown in Equation 1 below.

$$L_{eq} = M_{f12} + L_{f1} \| L_{f2} = M_{f12} + (L_{f1} \times L_{f2})/(L_{f1} + L_{f2}) \qquad \text{EQ. 1}$$

Figure 7:
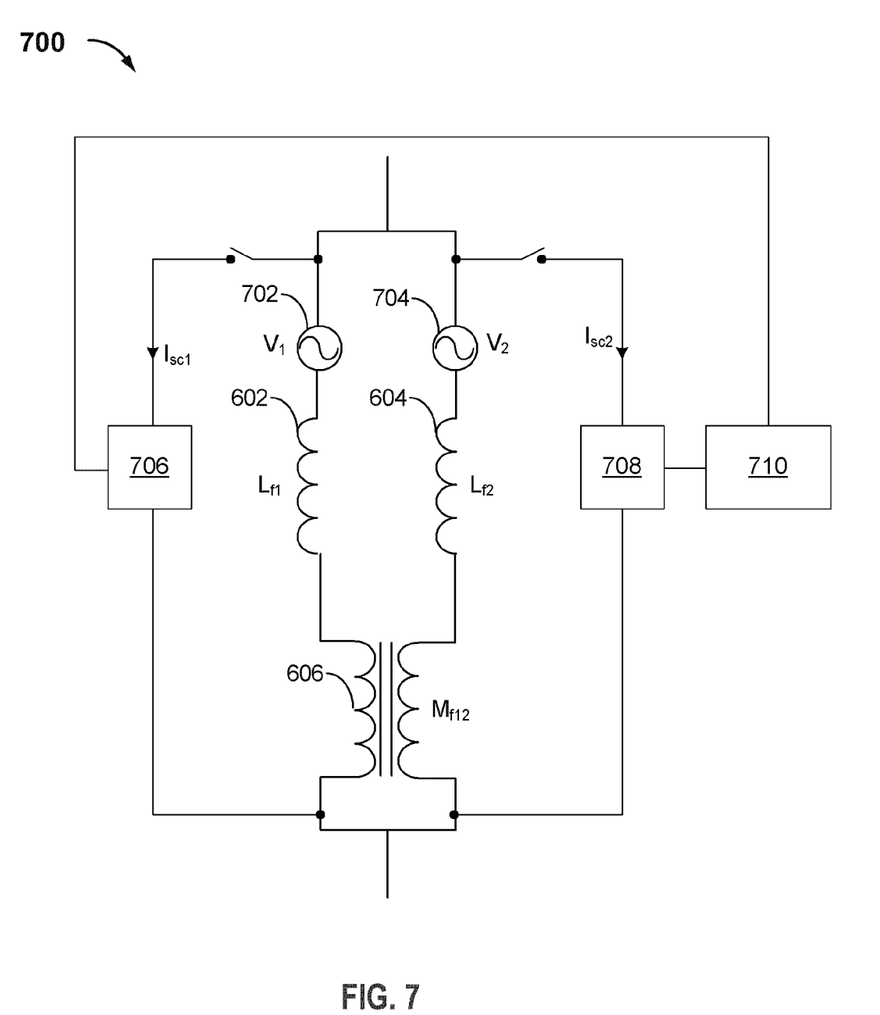
FIG. 7 shows an equivalent circuit diagram of the equivalent circuit diagram of FIG. 6 when an alternating magnetic field is generated in proximity of the first coil and the second coil, as previously described in connection with FIGS. 4 and 5.

FIG. 7 shows an equivalent circuit diagram 700 of the equivalent circuit diagram 600 of FIG. 6 when an alternating magnetic field is generated in proximity of the first coil 402 and the second coil 404, as previously described in connection with FIGS. 4 and 5. When magnetic flux flows through a cross section formed by the windings of the first conductor 506 and the second conductor 508 (FIGS. 4 and 5) a voltage is induced across each of the first conductor 506 and the second conductor 508. Such induced voltages may be represented by a first voltage source 702 providing a first voltage $V_1$ and a second voltage source 704 providing a second voltage $V_2$. In practice it may be difficult to measure the voltages $V_1$ and $V_2$. Thus, at least one sensor circuit 706, 708 may be configured to measure respective short circuit currents $I_{sc1}$, $I_{sc2}$ driven by the induced voltages $V_1$ and $V_2$, respectively. In some implementations, the currents $I_{sc1}$ and $I_{sc2}$ may flow through resistors having low resistances (not shown) in the sensor circuits 702, 704 and a voltage appearing across the low-resistance resistors (not shown) may be measured by the sensor circuits 706, 708. Although a plurality of sensor circuits 706, 708 are shown, a single sensor circuit may be configured to separately measure each of $I_{sc1}$ and $I_{sc2}$. In some implementations, a controller 710 may be configured to receive the measured values for $I_{SC1}$ and $I_{SC2}$ and determine a direction and distance of misalignment between the base pad and the vehicle pad.

In operation, when the base pad (not shown) is not physically aligned over a center of a vehicle coupler comprising the first coil 402 and the second coil 404, one of the first conductor 506 and the second conductor 508 will cut through more magnetic flux than the other. For example, in some implementations, the conductor that is closer to the base pad (FIGS. 1-3) generating the magnetic field may cut through more magnetic flux than the other conductor. The voltages $V_1$ and $V_2$, and so the short circuit currents $I_{sc1}$ and $I_{sc2}$, will be proportional to the amount of magnetic flux the first conductor 506 and the second conductor 508 cut through, respectively. Thus, if the base pad is located closer to the first conductor 506 than to the second conductor 508, $V_1$ may be larger than $V_2$. Consequently, $I_{sc1}$ will also be larger than $I_{sc2}$. In the opposite case, these outcomes would be reversed, as may be more easily seen in FIGS. 8 and 9 below.

Figure 8:
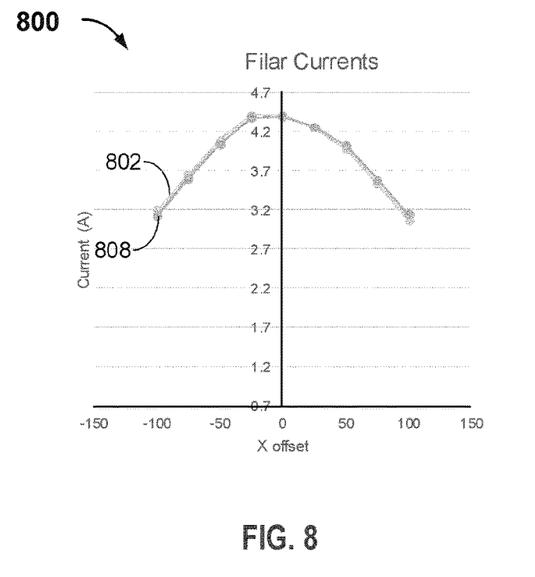
FIG. 8 shows a graph illustrating a first trace of the short circuit current $I_{sc1}$ and a second trace of the short circuit current $I_{sc2}$ versus a lateral offset in millimeters (mm) from a centered alignment of the base pad (not shown) over the first coil and the second coil 404 of FIG. 4, in accordance with some implementations.

FIG. 8 shows a graph 800 illustrating a first trace 802 of the short circuit current $I_{sc1}$ and a second trace 804 of the short circuit current $I_{sc2}$ versus a lateral offset in millimeters (mm) from a centered alignment of the base pad (not shown) over the first coil 402 and the second coil 404 of FIG. 4, in accordance with some implementations. As shown, the current $I_{sc1}$ is larger than the current $I_{sc2}$ for offsets in the negative direction, while the current $I_{sc2}$ is larger than the current $I_{sc1}$ for offsets in the positive direction. Accordingly, a direction of offset between a base pad and a vehicle pad may be determined based solely upon comparison of the measurements of $I_{sc1}$ and $I_{sc2}$ for at least two different conductors (e.g., the first conductor 506 and the second conductor 508, respectively). In some implementations, the distance may also be determined based at least in part upon those measurements of $I_{sc1}$ and $I_{sc2}$.

Figure 9:
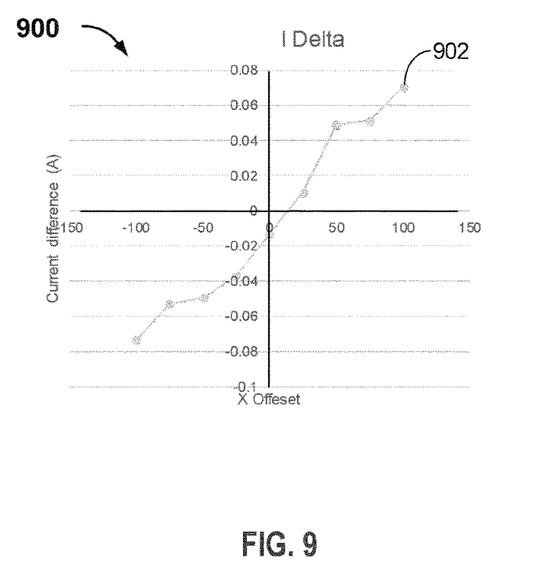
FIG. 9 shows a graph illustrating a trace of the difference between the values of the first trace (e.g., $I_{sc1}$) and the second trace (e.g., $I_{sc2}$) versus a lateral offset in mm from the centered alignment of the base pad and the first coil and the second coil of FIG. 4, in accordance with some implementations.

FIG. 9 shows a graph 900 illustrating a trace 902 of the difference between the values of the first trace 802 (e.g., $I_{sc1}$) and the second trace 804 (e.g., $I_{sc2}$) versus a lateral offset in mm from the centered alignment of the base pad and the first coil 402 and the second coil 404 of FIG. 4, in accordance with some implementations. As shown, the difference becomes more negative as the offset moves in the negative direction, and becomes more positive as the offset moves in the positive direction. Thus, the controller 710 within the vehicle or within the stationary base system may be able to determine an estimated distance of the offset based on a magnitude of the difference shown in trace 902 and a direction of that distance based on a sign of that difference or based on a sign of a deviation from a known value for a known aligned state.

Figure 10:
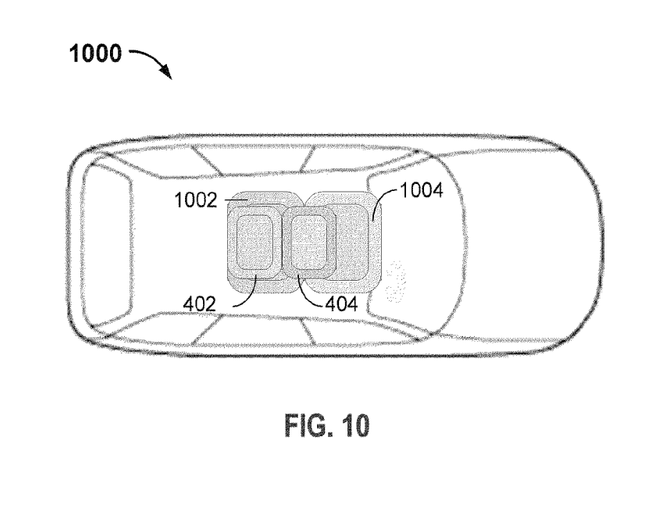
FIG. 10 is a diagram showing a misalignment between a base pad and a vehicle pad in a first direction, in accordance with some implementations.

FIG. 10 is a diagram 1000 showing a misalignment between a base pad and a vehicle pad in a first direction, in accordance with some implementations. The base pad may comprise a double D coil configuration of a first transmit coil 1002 and a second transmit coil 1004 adjacent to the first transmit coil. In some other implementations, the base pad may comprise a bipolar coil configuration where the first and second transmit coils 1002, 1004 at least partially overlap one another. In yet other implementations, the first and second transmit coils 1002, 1004 may comprise one or more circular coils. The vehicle pad may comprise a double D coil configuration, as previously described, including the first coil 402 and the second coil 404 disposed adjacent to the first coil 402. In FIG. 10, the vehicle pad comprising the first and second coils 402, 404 are shown as misaligned to the left of the based pad. This position may correspond to the traces 802, 804 of FIG. 8 to the left of the 0 X-offset and to the trace 902 of FIG. 9 to the left of the 0 X-offset. In such a condition, the controller 710 may receive measurements of $I_{sc1}$ and $I_{sc2}$ from the sensing circuits 706, 708 and, based on their comparative values, determine a direction of offset (e.g., either positive or negative) between the base pad and the vehicle pad. The controller 710 may additionally determine a distance of that offset based at least in part on the measured magnitude of $I_{sc1}$ and $I_{sc2}$ and/or a magnitude of their difference.

Figure 11:
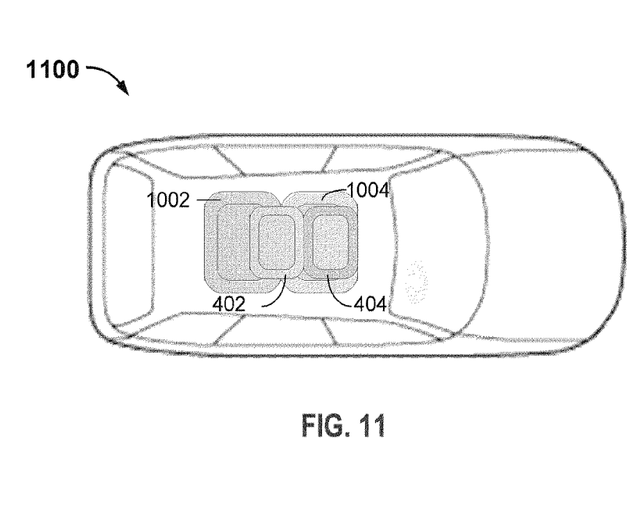
FIG. 11 is a diagram showing a misalignment between a base pad and a vehicle pad in a second direction, in accordance with some implementations.

FIG. 11 is a diagram 1100 showing a misalignment between a base pad and a vehicle pad in a second direction, in accordance with some implementations. All components of FIG. 10 are reproduced in FIG. 11. The vehicle pad comprising the first and second coils 402, 404 are shown as misaligned to the right of the based pad in FIG. 11. This position may correspond to the traces 802, 804 of FIG. 8 to the right of the 0 X-offset and to the trace 902 of FIG. 9 to the right of the 0 X-offset. In such a condition, the controller 710 may receive measurements of $I_{sc1}$ and $I_{sc2}$ from the sensing circuits 706, 708 and, based on their comparative values, determine a direction of offset (e.g., either positive or negative) between the base pad and the vehicle pad. The controller 710 may additionally determine a distance of that offset based at least in part on the measured magnitude of $I_{sc1}$ and $I_{sc2}$ and/or a magnitude of their difference.

Figure 12:
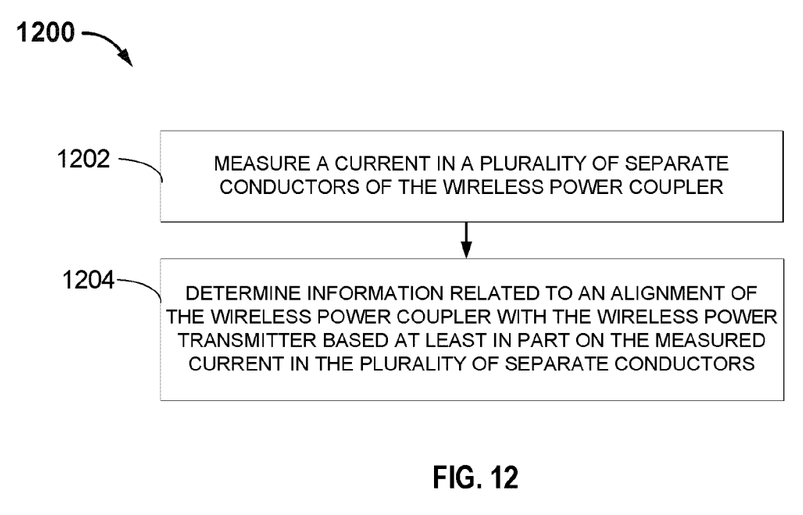
FIG. 12 illustrates a flowchart of a method for determining an alignment of a wireless power coupler of a vehicle with a wireless power transmitter, in accordance with some implementations.

FIG. 12 illustrates a flowchart 1200 of a method for determining an alignment of a wireless power coupler of a vehicle with a wireless power transmitter, in accordance with some implementations. The method of flowchart 1200 is described herein with reference to at least the first and second conductors 506, 508 of the first and second coils 402, 404 and the sensing circuits 706, 708 and the controller 710 as previously described in connection with FIGS. 4-7. In some implementations, one or more of the blocks in flowchart 1200 may be performed by the sensing circuits 706, 708 and/or the controller 710 of FIG. 7. Although the method of flowchart 1200 is described herein with reference to a particular order, in various embodiments, blocks herein may be performed in a different order, or omitted, and additional blocks may be added.

The method may start at block 1202, which includes determining information related to an alignment of the wireless power coupler with the wireless power transmitter based at least in part on the measured current in the plurality of separate conductors. For example, a direction and/or distance of offset between the wireless power coupler and the wireless power transmitter may be determined based at least in part on the measured currents $I_{sc1}$ and $I_{sc2}$. Specifically, such a determination may be based on a difference between the measured currents $I_{sc1}$ and $I_{sc2}$, or which of $I_{sc1}$ and $I_{sc2}$ is larger than the other.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for measuring a current in a plurality of separate conductors of the wireless power coupler may comprise at least one of the sensing circuits 706, 708 of FIG. 7. Means for determining information related to an alignment of the wireless power coupler with the wireless power transmitter based at least in part on the measured current in the plurality of separate conductors may comprise the controller 710 of FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the applications have been described herein. It is to be understood that not necessarily all such advantages may be achieved in accordance with any particular implementation of the application. Thus, concepts may be implemented or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for determining an alignment of a wireless power coupler of a vehicle with a wireless power transmitter, the apparatus comprising:
    a sensing circuit electrically coupled to the wireless power coupler and configured to measure a current in a plurality of separate conductors of the wireless power coupler, the plurality of separate conductors comprising a first conductor and a second conductor, wherein for each turn of the second conductor, the first conductor is wound outside of the second conductor; and
    a controller electrically coupled to the sensing circuit and configured to determine information related to an alignment of the wireless power coupler with the wireless power transmitter based at least in part on the measured current in the plurality of separate conductors, the information comprising an offset distance between the power coupler of the vehicle and the wireless power transmitter.

2. The apparatus of claim 1, wherein the controller is configured to determine the information related to the alignment of the wireless power coupler with the wireless charging power transmitter based on a difference between the measured current in the plurality of separate conductors.

3. The apparatus of claim 1, wherein the information comprises a direction of offset between the wireless power coupler and the wireless power transmitter.

4. The apparatus of claim 1, wherein the measured current is a short circuit current.

5. The apparatus of claim 1, wherein the wireless power coupler comprises a double D coupler.

6. The apparatus of claim 1, wherein the wireless power transmitter comprises a bipolar coil arrangement.

7. A method for determining an alignment of a wireless power coupler of a vehicle with a wireless power transmitter, the method comprising:
    measuring a current in a plurality of separate conductors of the wireless power coupler, the plurality of separate conductors comprising a first conductor and a second conductor, wherein for each turn of the second conductor, the first conductor is wound outside of the second conductor; and
    determining information related to an alignment of the wireless power coupler with the wireless power transmitter based at least in part on the measured current in the plurality of separate conductors, the information comprising an offset distance between the power coupler of the vehicle and the wireless power transmitter.

8. The method of claim 7, wherein determining information related to an alignment of the wireless power coupler with the wireless power transmitter is based on a difference between the measured current in the plurality of separate conductors.

9. The method of claim 7, wherein the information comprises a direction of offset between the wireless power coupler and the wireless power transmitter.

10. The method of claim 7, wherein the measured current is a short circuit current.

11. The method of claim 7, wherein the wireless power coupler comprises a double D coupler.

12. The method of claim 7, wherein the wireless power transmitter comprises a bipolar coil arrangement.

13. A non-transitory, computer-readable medium comprising code that, when executed, causes an apparatus for determining an alignment of a wireless power coupler of a vehicle with a wireless power transmitter to:
    measure a current in a plurality of separate conductors of the wireless power coupler, the plurality of separate conductors comprising a first conductor and a second conductor, wherein for each turn of the second conductor, the first conductor is wound outside of the second conductor, and
    determine information related to an alignment of the wireless power coupler with the wireless power transmitter based at least in part on the measured current in the plurality of separate conductors, the information comprising an offset distance between the power coupler of the vehicle and the wireless power transmitter.

14. The medium of claim 13, wherein the code, when executed, causes the apparatus to determine the information related to the alignment of the wireless power coupler with the wireless power transmitter based on a difference between the measured current in the plurality of separate conductors.

15. The medium of claim 13, wherein the information comprises a direction of offset between the wireless power coupler and the wireless power transmitter.

16. The medium of claim 13, wherein the measured current is a short circuit current.

17. The medium of claim 13, wherein the wireless power coupler comprises a double D coupler.

18. The medium of claim 13, wherein the wireless power transmitter comprises a bipolar coil arrangement.

19. An apparatus for determining an alignment of a wireless power coupler of a vehicle with a wireless power transmitter, the apparatus comprising:
    means for measuring a current in a plurality of separate conductors of the wireless power coupler, the plurality of separate conductors comprising a first conductor and a second conductor, wherein for each turn of the second conductor, the first conductor is wound outside of the second conductor; and
    means for determining information related to an alignment of the wireless power coupler with the wireless power transmitter based at least in part on the measured current in the plurality of separate conductors, the information comprising an offset distance between the power coupler of the vehicle and the wireless power transmitter.

20. The apparatus of claim 19, wherein the means for determining the information related to an alignment of the wireless power coupler with the wireless power transmitter is configured to determine the information related to the alignment of the wireless power coupler with the wireless charging power transmitter based on a difference between the measured current in the plurality of separate conductors.

21. The apparatus of claim 19, wherein the information comprises a direction of offset between the wireless power coupler and the wireless power transmitter.

22. The apparatus of claim 19, wherein the measured current is a short circuit current.

23. The apparatus of claim 19, wherein the wireless power coupler comprises a double D coupler.

24. The apparatus of claim 19, wherein the wireless power transmitter comprises a bipolar coil arrangement.

25. The apparatus of claim 19, wherein the means for measuring a current in a plurality of separate conductors of the wireless power coupler comprises a sensing circuit.

26. The apparatus of claim 19, wherein the means for determining information related to an alignment of the wireless power coupler with the wireless power transmitter comprises a controller.

\* \* \* \* \*